Oct. 29, 1957     W. E. BROWN     2,811,598

STARTER SWITCH

Filed Aug. 3, 1954

INVENTOR.
William E. Brown
BY
Attorney

United States Patent Office 2,811,598
Patented Oct. 29, 1957

2,811,598

STARTER SWITCH

William E. Brown, Anderson, Ind., assignor to General Motors Corporation, Detroit, Mich., a corporation of Delaware Application August 3, 1954, Serial No. 447,582

1 Claim. (Cl. 200—61.54)

This invention relates to mechanism for controlling the operation of a starting motor for starting an internal combustion engine, particularly the engine of an automotive vehicle, and more specifically to switch mechanism, the operation of which is controlled by one of the control instrumentalities of said vehicle.

An object of the present invention is to provide a novel starting motor control apparatus which can effect energization of the starting motor when the transmission control lever is moved to its "neutral" position but which cannot cause the starting motor to become operative when such control lever is moved to any one of its several other controlling positions.

The control lever of an automatic transmission generally has five control position, namely, Park, Neutral, Drive, Low and Reverse, and is positioned adjacent to and just below the steering wheel. One feature of the present invention is the provision of improved control means operated by a movement of such lever upwardly, toward the steering wheel, after it has been rotated to its "neutral" position, to cause the starting motor to become operative to crank the engine, and the provision of means to prevent actuation of the starting motor as the result of any other movement of the control lever.

Further objects and advantages of the present invention will be apparent from the following description, reference being had to the accompanying drawings wherein a preferred embodiment of the present invention is clearly shown.

Figures 1, 2, 3, 4:
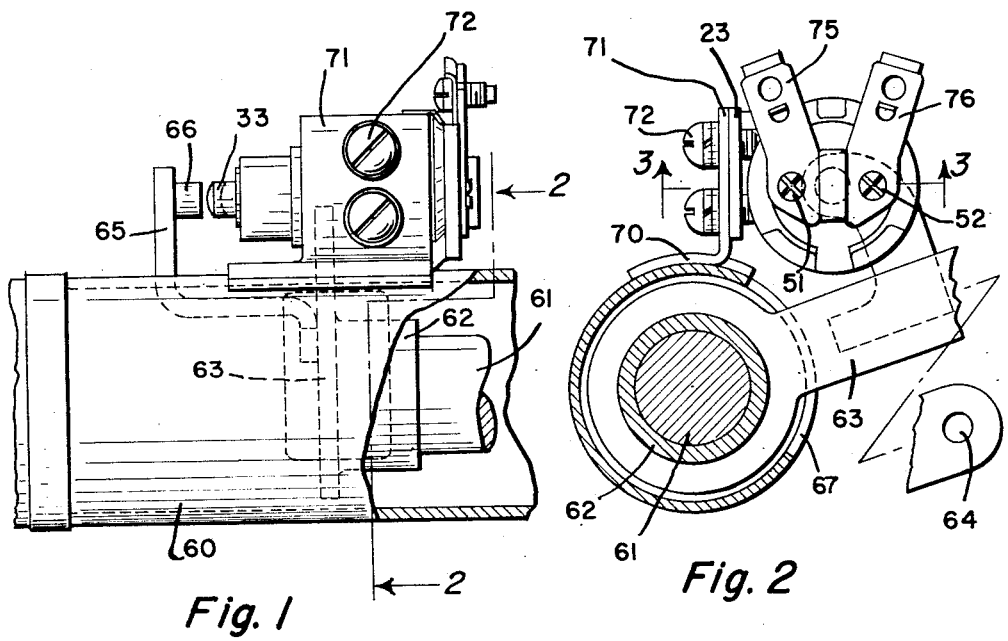
Figure 1 is a side elevational view of the lower end of the steering column post.
Figure 2 is a view looking in the direction of arrow 2 in Figure 1, and partly in section.
Figure 3 is a sectional view of the structure shown in Figures 2 and 3 and taken on line 3—3 of Figure 2.
Figure 4 is a sectional view of a modified form of a switch actuator.

Referring to the drawing, 20 designates a cup-shaped housing having a flat, bottom wall 21. The housing 20 is attached to a bracket 23 by a tubular bearing member or bushing 24 having a reduced portion 25, and a flange or collar 26 intermediate its ends. The reduced portion passes through aligned openings in the bracket and the bottom wall 21 and is deformed at 27 against wall 21 to force the bracket 23 against the collar 26, as clearly shown in Figure 3. The interior of the bushing 24 is bored to provide bores 28, 29 and 30, of different diameters, and shoulders 31 and 32 between the bores. The bushing receives an actuating member or plunger 33 having a collar 34 which has a sliding fit in the bore 29 and forms a seat for one end of a compression spring 35, the other end of which engages the shoulder 32. This spring urges the plunger to the right, as viewed in Figure 3.

A sealing ring 36 of any suitable material, such as an O-ring of soft rubber, is placed in the bore on the right side of the collar 34. The O-ring forms a seal between the interior of the bore 29 and the exterior of the plunger 33 to prevent moisture or dirt from getting into the interior of the bushing or the housing 20. The plunger is retained in the bushing 24 by a plain washer 37 which seats against the shoulder 31, and a somewhat cup-shaped washer 38 which forms, between itself and the washer 37, a pocket in which a felt washer 39 is positioned and which fits tightly enough around the plunger to act as a seal to aid in keeping foreign matter from the interior of the bushing or housing 20. The washers 37, 36 and 39 are clamped against the shoulder 31 by spinning over the end of the bushing, as indicated at 39a in Figure 3.

The plunger 33 is provided with a reduced portion 40 on which is mounted a cup-shaped washer 40a, a movable contact or bridging member 41 and a spring 42 which urges the contact to the left in Figure 3. The bridging member 41 is carried by a flanged collar 43 which is slidable on the reduced portion 40 of the plunger 33, and the contact is insulated from the flanged collar by insulating washers 44 and 45 which are clamped between the flanges of the collar 43 and which hold the contact in position thereon, the contact collar and washers forming a contact assembly slidable on the shaft as a unit and designated in its entirety by the numeral 47. The movable contact assembly 47 is prevented from coming off the plunger, in response to pressure of spring 42, by a metal washer 48 which is held against a shoulder 49 of the plunger 33 by riveting over the end of the plunger, as indicated at 48a. Since the movable contact assembly is slidable on the reduced portion 40 of the plunger, the bridging member 41 may move with respect to the plunger when said movable contact is moved into engagement with stationary contacts 51 and 52, as will be later described, but is normally held in the position shown in the drawings by spring 42. In this manner, a good electrical contact is assured. The spring 35 normally serves to maintain the contact out of engagement with the stationary contacts 51 and 52.

It should be noted that the insulating washer 45 has a projecting flange of sufficient diameter to be engaged by one end of spring 42 so that the latter is effective to hold the contact assembly against the washer 48 normally, when the switch is in its open position.

The housing 20 is enlarged in form at 53 to form a shoulder 54. This enlarged portion 53 receives a switch block or closure 55 which carries the stationary contacts 51 and 52. The block 55 is made of insulating material and is retained in position by a series of tangs 55a extending from the enlarged portion 53 of the housing 20 which are bent over the outer surface of the block, as shown in Fig. 3, to force the block 55 against the shoulder 54. The inner face of the block 55 is formed with a central recess 56 into which the left end of the plunger 33, as seen in Fig. 3, may be moved when the switch is closed.

The above-described switch mechanism is supported on the steering column of the automotive vehicle near the lower end thereof, as shown in Figs. 1 and 2, and may be operated by the lever which controls the transmission, when such lever is in neutral position, but cannot be operated by the lever when the latter is in any other position.

The steering column through which the shaft to which the steering wheel (not shown) is attached, is designated by the numeral 60 and is held in fixed position by suitable supports. Extending through the steering column and spaced from the inner wall thereof is the steering shaft 61 which is rotatable in suitable bearings and slidable on this shaft is a sleeeve 62 which is also rotatable on the shaft. Secured to the lower end of this sleeve, in any suitable way, is a lever arm 63 and in an opening 64 at the end of such arm an operating connection leading to the transmission, is adapted to be connected.

Connected to the arm 63 by welding, brazing or in any other suitable way is an arm 65 which is both laterally and axially offset with reference to the arm 63, so that when the arm is rotated to a position in alignment with the switch plunger 33, an operating lug 66 for said plunger, which is integral with or secured to the arm 65, is positioned slightly to the left of the end of plunger 33, as indicated in Fig. 1.

The sleeve 62 is connected at its upper end adjacent the steering wheel to the usual control lever which is rotatable to the several different positions previously enumerated to control the operation of the vehicle transmission and in one of these positions the transmission is in neutral, so that operation of the engine does not effect movement of the vehicle. When the control lever is moved to this neutral position, the arm 65 is in the position shown in Fig. 2, so that the lug 66 is in direct alignment with the plunger 33 and a movement of the control lever and sleeve 62 to the right, as seen in Fig. 1, will effect movement of the contact assembly 47 sufficiently to bring moveable contact 41 into engagement with fixed contacts 51 and 52. In order to permit this movement of arm 63 and sleeve 62, the arm extends through a slot 67 in the steering column of sufficient magnitude to permit the required rotary and axial movement of the arm 63. The arm 65 is secured to arm 63 at a point outside the steering column so that it does not extend through the slot but lies entirely outside the steering column.

The housing 20 is supported in such position that the plunger 33 is in alignment with the lug 66 when the transmission control lever is in its neutral position by a suitable mounting bracket 70 which is welded or otherwise secured to the steering column 60 and has a laterally projecting portion 71 to which the bracket 23 that carries the housing 20 is suitably connected by attaching screws 72, as best shown in Figs. 1 and 2.

The switch contacts 51 and 52 extend through metal terminal straps 75 and 76 and the latter are held in position against the block of insulating material 55 by the contacts, the ends of which are spread as indicated in Fig. 3 to clamp the straps in position. A rectangular lug projects from the block 55 and lies between the straps 75 and 76 to prevent any rotation of the straps on the contacts. Adjacent the ends of straps 75 and 76 are binding posts 78 and 79, respectively, and to these binding posts suitable electrical conductors are adapted to be connected.

The switch disclosed herein may be connected directly with the battery and starting motor so that it would be itself, the main starter switch and the staring motor would be entirely manually controlled. On the other hand, the switch may be connected in a control circuit which controls the operation of the main starter switch, such a control circuit as shown in the patent to Dyer, No. 2,287,791 of June 30, 1942, for example. If connected in a circuit such as that of Dyer, the starting motor would be controlled not only by this switch, but also by other switches responsive to engine suction and the generator. So far as the present switch is concerned, it is immaterial in what sort of circuit it is used.

The transmission control lever and the specific arrangement of such lever and the sleeve 62 and the control lever to which it is connected are not shown as the specific construction and arrangement of these parts is not material to the present invention. Any construction which would permit the desired rotary and axial movement of sleeve 62 to effect operation of the plunger 33 can be employed, so that the particular construction which is used forms no part of the present invention.

A modification of the bushing or fitting 24 and the actuating member 33 are shown in Fig. 4. In this instance, the bushing 124 has a plurality of bores 128, 129 and 130, and two shoulders 131 and 132 between the bores. The bushing 124 is attached to the housing 20 in exactly the same way as bushing 24 is attached. The bore 129 receives a seal ring comprising an O-ring 136 of soft rubber which functions in the same way as seal ring 36. The bore 130 receives a pair of metal washers 133 and 134 with a felt washer 135 therebetween. The felt washer 133 and the O-ring provide a weatherproof seal about the plunger. Slidable in the bushing is a plunger 137 comparable to the plunger 33 and at its right end this plunger is bored to form a suitable recess to receive a pin 138 integral with or secured to a button 139 and the pin is suitably fixed in the recess. A spring 140 is positioned between the washer 134 and button 139. This spring urges the button to the right and normally holds the parts in the position shown in Fig. 4.

In order to limit the outward movement of the plunger, a stop element may be formed thereon by deforming the metal of the plunger so as to form a flange 141 projecting radially outward. Before the plunger is assembled with the bushing, a cup-shaped washer 142 similar to washer 40a is placed adjacent the flange so that it will be interposed between the flange and the inner end of the bushing. The washer cooperates with the flange and the end of the bushing to limit the outward movement of the plunger. The location of the flange on the rod determines the length of stroke of the plunger.

While the embodiment of the present invention as herein disclosed constitutes a preferred form, it is to be understood that other forms might be adopted.

What is claimed is as follows:

A neutral safety switch for controlling the starter motor circuit of an automotive vehicle in accordance with the position of a transmission selector device, the combination comprising; a casing, a pair of fixed contacts within the casing, a bridging member adapted to close a circuit between said fixed contacts, a reciprocable rod slidably carrying said bridging member, a pair of stops on the rod for limiting the slidable movement of said bridging member thereon, spring means acting between one of said stops and the bridging member for normally urging the bridging member into contact with the other of said stops and toward said fixed contacts, a shoulder on the rod remote from said stops, a second spring means acting between a portion of the casing and said shoulder for normally urging the rod in a circuit opening direction with respect to the fixed contacts and the bridging member, an operating means for said switch adapted to be rotated to a plurality of predetermined positions and to be reciprocable in one of said predetermined positions by said selector, and means extending laterally from said operating means and into proximity to said rod for moving the rod against the action of the second and then the first spring means to cause the bridging member to move into circuit closing position with respect to said fixed contacts, said last named means only being effective when the operating means has been rotated to said one predetermined position and has been reciprocated in that position.

References Cited in the file of this patent

UNITED STATES PATENTS

| | | |
|---|---|---|
| 1,536,953 | Waters | May 5, 1925 |
| 1,622,541 | Raley et al. | Mar. 29, 1927 |
| 2,324,819 | Butzbach | July 20, 1943 |
| 2,489,617 | Byram | Nov. 29, 1949 |
| 2,584,477 | Lindenmuth | Feb. 5, 1952 |
| 2,584,478 | Lindenmuth | Feb. 5, 1952 |
| 2,647,178 | Handy | July 28, 1953 |